Figure 1:
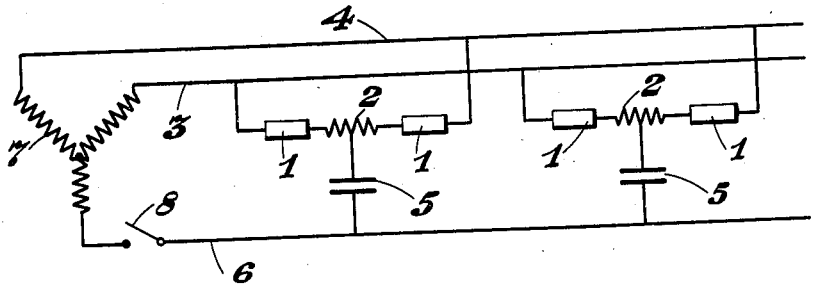

June 11, 1935.  C. BOL ET AL  2,004,565

GASEOUS ELECTRIC DISCHARGE DEVICE

Filed June 18, 1934

INVENTORS
Cornelis Bol
Eduard G. Dorgelo.
BY Harry E. Dunham
ATTORNEY

Patented June 11, 1935

2,004,565

UNITED STATES PATENT OFFICE 2,004,565

GASEOUS ELECTRIC DISCHARGE DEVICE

Cornelis Bol and Eduard G. Dorgelo, Eindhoven, Netherlands, assignors to General Electric Company, a corporation of New York Application June 18, 1934, Serial No. 731,149
In the Netherlands June 24, 1933

3 Claims. (Cl. 176—124)

The present invention relates to gaseous electric discharge devices generally and more particularly the invention relates to starting and operating circuits for such devices.

The starting voltage of gaseous electric discharge devices is considerably higher than the operating voltage thereof. The difference between the starting voltage and the operating voltage can be absorbed by an impedance connected in series with the device. If a choke-coil is used for this purpose the apparatus has a low power factor, and if an ohmic resistance is used a quantity of power is wasted.

The object of the present invention is to provide a starting and operating circuit for gaseous electric discharge devices whereby the above difficulties are avoided. Still further objects and advantages attaching to the device and to its use and operation will be apparent to those skilled in the art from the following particular description.

In accordance with this object the new and novel starting and operating circuit comprises a group of at least two gaseous electric discharge lamp devices connected in series to two terminals of a three phase alternating current source and a switch to connect and disconnect the mid-point of the lamp circuit, between the two lamp devices, to the third terminal of the alternating current source. This switch is closed when the discharge devices are started into operation and a high voltage is thus applied across the devices to start the same into operation. After the devices have been started into operation the switch is opened to break the connection between the midpoint and the third terminal of the alternating current source. The series impedance necessary in the circuit for the stabilization of the discharge devices can be smaller in size than that in prior circuits so that the power factor of the circuit is improved or the power loss therein is decreased. In certain instances, discussed later herein, it is advantageous to connect an impedance in the circuit between the switch and the midpoint.

When the gaseous atmosphere of the discharge devices comprises a difficultly vaporizable material, such as sodium, it is advantageous to delay opening the switch until the devices have been operating an appreciable time. The devices are thus overloaded for a short period, whether the midpoint is connected directly or through an impedance to the third terminal of the current source, and are rapidly raised to their operating temperature so that the metal vapor therein is rapidly brought to its effective pressure in said devices.

It is advantageous to connect one or more choke coils in the circuit on either side of the mid-point connected to the third terminal of the current source. A simple manner in which this can be accomplished is by connecting a choke coil in the circuit in the center of the group of discharge devices and connecting the mid-point of the choke coil to the third terminal of the current source through an impedance.

When the gaseous atmosphere of the devices comprises the vapor of a difficultly vaporizable material, such as sodium, we prefer to connect a condenser between the terminal of the current source and the mid-point of the group of discharge devices. A condenser having an impedance considerably larger than that of the self-inductance on each side of the mid-point of the group of discharge devices is desirable. This arrangement causes rapid heating of the discharge devices as disclosed in co-pending application Serial Number 721,058, filed April 17, 1934, the inventors being Willem Uyterhoeven, Mari Johan Druyvestein, Cornelis Verburg and Lourens Blok.

Several groups of discharge devices can be connected between the two terminals of the alternating current source, when desired. The mid-point of each group is connected to a common conductor which is connected and disconnected by a switch to the third terminal of the current source to effect starting and operation of the devices as above described.

Figure 2:
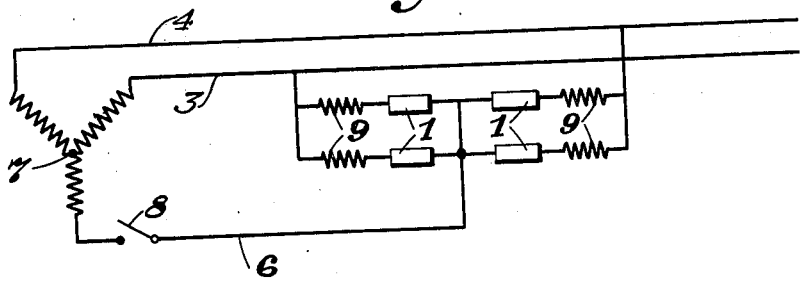
Figure 3:
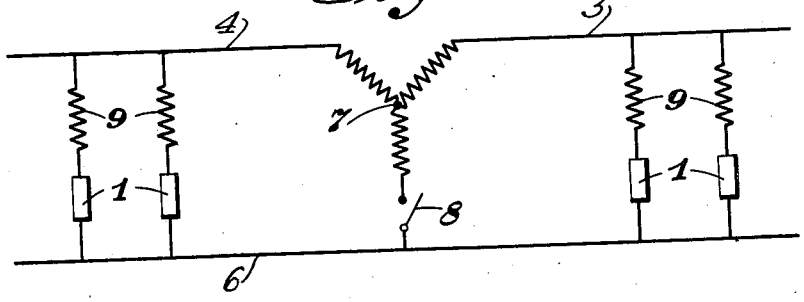

In the drawing accompanying and forming part of this specification three circuits, each embodying the invention, are shown, in which, Fig. 1 is a schematic view of one embodiment of the invention, Fig. 2 is a similar view of another embodiment of the invention, and Fig. 3 is a similar view of still another embodiment of the invention.

Like numbers denote like parts in all the figures.

The embodiment of the invention illustrated in Fig. 1 of the drawing comprises two groups of gaseous electric discharge lamp devices 1, each group consists of two of said devices connected in series. The discharge devices 1 are shown schematically in the drawing and consist of an elongated container, a gaseous atmosphere therein, and electrodes therein which are electron emitting. The gaseous atmosphere consists of a rare gas, such as neon, a mixture of rare gases, a mixture of metal vapors, or a mixture of gas and metal vapor, such as a mixture of argon and mercury, or neon and sodium vapor. A choke-coil 2 is connected in series with each pair of said devices 1 and between the members of each pair. Each pair of said devices 1 is connected across the leads 3 and 4 of the secondary 7 of a three-phase transformer. The mid-point of the choke-coil 2 is connected through a condenser 5 to the conductor 6 of said secondary 7. A switch 8 is connected into said conductor 6.

The apparatus is started into operation by closing switch 8 which connects said discharge devices 1 in series with one half of the choke coil 2 and the condenser 5 across two separate phases of the three phase current source. After the discharge devices 1 have been started into operation the switch 8 is moved to its contact breaking position and each pair of discharge devices 1 together with the choke coil 2 for the pair is then connected in series across the third phase of the current source. The voltage applied to each of said discharge devices 1 during the starting period is thus considerably higher than the voltage applied thereto during the operation thereof. The discharge devices 1 are thus started into operation and the choke coil 2 is of smaller dimensions than it could be if it had to absorb the difference between the starting voltage and the operating voltage during the operation of the discharge devices 1. The choke-coil 2 is made of sufficient size to merely perform the function of stabilizing the discharge in said devices 1. This improves the power factor of the apparatus and a higher operating voltage can be used for the discharge devices 1.

When the gaseous atmosphere of the discharge devices 1 comprises the vapor of a difficultly vaporizable material, such as sodium, the condenser 5 is of such size that the impedance thereof is considerably greater than twice that of one-half the choke-coil 2. Rapid heating of the container of the discharge devices 1 is thus effected and the vaporizable material is quickly vaporized to rapidly build up an effective metal vapor pressure in said device.

It is obvious that the number of groups of discharge devices 1 can be increased. As the mid-point of each of said choke-coils 2 is connected to a conductor 6 common to all of the mid-points a single switch 8 connected into the common conductor 6 is sufficient. When desired, the switch 8 is left in its contact making position an appreciable time after the discharge devices 1 have been started into operation to overload said devices 1 which causes rapid heating of the devices 1 to quickly vaporize the vaporizable material therein and rapidly build up an effective metal vapor pressure. The switch 8 can be provided with a timing means, such as a thermostatic element controlled by the temperature of said devices, to delay the opening thereof until said discharge devices 1 have reached their operating temperature. It is likewise obvious that more than one tube can be connected on each side of the mid-point of each group.

The embodiment of the invention illustrated in Fig. 2 of the drawing is similar to that illustrated in Fig. 1 except that in this embodiment two discharge devices 1 are connected in parallel on either side of the mid-point of the group. Each discharge device in this circuit has a choke-coil 9 connected in series therewith and the mid-point of the group is connected directly, without a condenser, to the third terminal of the alternating current source.

The discharge devices 1 in each group are separated a considerable distance, when desired. For example, when the embodiment of the invention illustrated in Fig. 2 of the drawing is used for the illumination of roads, airports or the like the leads 3 and 4 extend from either side of the secondary 7 as shown in Fig. 3 of the drawing.

While we have shown and described and have pointed out in the annexed claims certain novel features of the invention, it will be understood that various omissions, substitutions and changes in the forms and details of the device illustrated and in its use and operation may be made by those skilled in the art without departing from the broad spirit and scope of the invention, for example, when switch 8 is in its open circuit position it can be connected to the star point of the alternating current source, when desired.

What we claim as new and desire to secure by Letters Patent of the United States is:—

1. A starting and operating circuit for a plurality of gaseous electric discharge devices comprising in combination, a three-phase alternating current source for said devices, a series connected stabilizing impedance for said devices, said devices being connected in groups comprising at least two of said devices, the devices in each group being connected in series across two terminals of said current source and means to connect the mid-point of each group to the third terminal of said current source during the starting period of said current source and to disconnect the mid-point from the third terminal during the operation of said devices.

2. A starting and operating circuit for a plurality of gaseous electric discharge devices comprising in combination, a three-phase alternating current source for said devices, said devices being connected in groups comprising at least two of said devices, the devices in each group being connected in series across two terminals of said current source, an impedance connected in series with and between the devices in each group, means to connect the mid-point of said impedance to the third terminal of said current source during the starting period of said device and to disconnect the mid-point from the third terminal during the operation of said devices and another impedance connected between the mid-point of said first named impedance and said connecting and disconnecting means.

3. A starting and operating circuit for a plurality of gaseous electric discharge devices comprising in combination, a three-phase alternating current source for said devices, a series connected stabilizing impedance for said devices, said devices being connected in groups comprising at least two of said devices, the devices in each group being connected in series across two terminals of said current source, the devices in one of said groups being connected in parallel with the devices in another of said groups, the mid-point of each group being connected to a common conductor and means to connect said common conductor to the third terminal of said current source during the starting of said devices and to disconnect said conductor from said terminal during the operation of said devices.

CORNELIS BOL.
EDUARD G. DORGELO.